(12) United States Patent
Krishnamachari

(10) Patent No.: US 6,898,758 B2
(45) Date of Patent: May 24, 2005

(54) CROSS MEDIA ERROR PROTECTION METHOD AND SYSTEM

(75) Inventor: Santhana Krishnamachari, Ossining, NY (US)

(73) Assignee: Koninklijke Philips Electronics N.V., Eindhoven (NL)

(*) Notice: Subject to any disclaimer, the term of this patent is extended or adjusted under 35 U.S.C. 154(b) by 394 days.

(21) Appl. No.: 09/885,698

(22) Filed: Jun. 20, 2001

(65) Prior Publication Data

US 2002/0199148 A1 Dec. 26, 2002

(51) Int. Cl.[7] .......... G06F 11/00; G08C 25/00; H03M 13/00; H04L 1/00
(52) U.S. Cl. .......... 714/799; 370/471; 370/473; 370/476; 370/535; 714/752
(58) Field of Search .............. 714/752, 799; 370/509, 535, 537, 470, 471–476

(56) References Cited

U.S. PATENT DOCUMENTS

| | | | | |
|---|---|---|---|---|
| 5,453,987 A | * | 9/1995 | Tran | 370/447 |
| 5,544,328 A | * | 8/1996 | Seshadri | 375/261 |
| 5,729,648 A | * | 3/1998 | Boyce et al. | 386/68 |
| 5,844,885 A | * | 12/1998 | Grob et al. | 370/216 |
| 5,920,581 A | * | 7/1999 | Lang | 714/799 |
| 6,233,251 B1 | * | 5/2001 | Kurobe et al. | 370/471 |
| 6,597,708 B1 | * | 7/2003 | Mauger et al. | 370/535 |

FOREIGN PATENT DOCUMENTS

| | | | |
|---|---|---|---|
| EP | 0860999 A1 | 9/1997 | H04N/7/24 |
| EP | 0935363 A1 | 6/1998 | H04L/1/00 |
| EP | 0935363 A1 * | 11/1999 | H04L/1/00 |

* cited by examiner

*Primary Examiner*—Guy J. Lamarre

(57) ABSTRACT

A system and method for providing cross media error protection for multimedia data. The cross media error protection comprises: a packaging system for packaging the multimedia data into discrete packets, wherein each packet includes a plurality of fields, and wherein data segments from each of the media streams are placed into different ones of the plurality of fields; and an insertion system for inserting error protection data into one of the plurality of fields in each packet. In addition, a size of each of the plurality of fields may be made proportional to the size of each of the plurality of media streams over a time interval.

15 Claims, 2 Drawing Sheets

CROSS MEDIA ERROR PROTECTION METHOD AND SYSTEM

BACKGROUND OF THE INVENTION

1. Technical Field

The present invention relates to error protection schemes, and more particularly relates to a system and method of cross media error protection for multimedia data streams.

2. Related Art

Error protection techniques are used to protect electronic data and information from errors. The types of data that can be protected may include, for example, simple data files, multimedia data (e.g., video and audio), or web pages. Errors primarily occur during transmission, but can also be caused by other activities such as writing or reading data to or from storage. Error protection schemes function by adding redundancy to the data. The redundancy can be used to both detect and correct errors. The effectiveness of a given error protection scheme generally depends on the amount of redundancy added.

Areas where protection is becoming more vital include multimedia data and web content, both of which typically contain multiple media streams. For example, a video program may contain one or more video, audio and text streams. Similarly, a web page may contain audio, video and text data embedded therein Typically, the sizes or bandwidths of the various media streams are different, with video streams generally using up a large percentage of the bandwidth, followed by audio, and then text. For the purposes of this invention, the term "multimedia" shall refer to any content that includes multiple media streams.

In today's information environment, data comprised of multiple media streams are often sent simultaneously to devices with different capabilities. Thus, for example, a computer or a TV that has audio, video, and text display capabilities can decode and display all the streams. Conversely, an audio player may only decode the audio stream, and a cell-phone or a personal digital assistant (PDA) with a text-only display will only decode the text stream. Therefore, in such an environment, the protection of all the individual streams becomes equally important.

Conventional methods of protecting such content are to protect each media stream independently, i.e., packets of bits from each media stream are packaged independently, and a certain number of redundancy bits are added to each packet. Thus, a number of video packets, audio packets and text packets will be created, each with their own redundancy or error checking bits. The problem with such independent protection is that a transmission error may wipe out one media stream completely, e.g., the text stream, thereby "starving" the PDA user.

An example of this scheme is shown in FIG. 2, which depicts a plurality of media streams 30, each packaged with redundancy bits R. Assume in a given interval of time, 80 bits of stream-1 (video V), 32 bits of stream-2 (audio A) and 16 bits of stream-3 (text T) are generated. In the example depicted in FIG. 2, each stream is broken into packets sizes of twenty bits (sixteen information plus four redundancy bits R), thus providing 25% redundancy for error protection. For example, sixteen video bits 32 are packaged with four redundancy bits 34, etc. In this example, there are five video packets, two audio packets and one text packet that are independently protected with redundancy bits R.

Now, suppose the transmission medium introduces an error in one of the packets and the error is such that the redundancy information is insufficient to correct the error. If this error happens to be in the packet carrying the text information 35, then the text information associated with this time period is completely lost. Since the text packet 35 is completely lost, a device like a PDA that can only display the text information has no data to display for this period of time. Therefore, the PDA users receive no information during the interval, whereas users of a PC or an audio player can still receive and process the other streams.

Accordingly, a need exists to provide a system whereby the risk of complete data loss or starvation is reduced in a setting with multiple media streams.

SUMMARY OF THE INVENTION

The present invention overcomes the above-mentioned problems, as well as others, by providing a cross media error protection system that combines portions of the different media streams into each packet. The amount of each media stream type inserted into each packet may be proportional to the overall size of the different media streams.

In a first aspect, the invention provides a cross media error protection system for multimedia data having a plurality of media streams of different type, the system comprising: a packaging system for packaging the multimedia data into discrete packets, wherein each packet includes a plurality of fields, and wherein data segments from each of the media streams are placed into different ones of the plurality of fields; and an insertion system for inserting error protection data into one of the plurality of fields in each packet.

In a second aspect, the invention provides an encoder for packaging multimedia data having a first and a second type of media stream, comprising: means for packaging the multimedia data into discrete packets, wherein each packet includes a first field for holding a segment of the first type of media, a second field for hold a segment of the second type of media stream, and a third field for holding error protection data; wherein the sizes of the first and second field are proportional to the sizes of the first and second media stream.

In a third aspect, the invention provides a decoder for un-packaging multimedia data having a first and a second media stream of different type, the decoder comprising: means for reading multimedia data from discrete packets, wherein each packet includes a first field having a segment from the first media stream, a second field having a segment from the second media stream, and a third field having error protection data; wherein the sizes of the first and second field are proportional to the sizes of the first and second media stream.

In a fourth aspect, the invention provides a method for providing cross media error protection for multimedia data, the method comprising the steps of: receiving multimedia data having a plurality of media streams, each of a different type; determining a size of each media stream; packaging the multimedia data into a plurality of discrete packets, wherein each discrete packet includes a data segment from each of the media streams, and wherein a size of each packet is proportional to the size of each media stream; and inserting error protection data into each packet.

In a fifth aspect, the invention provides a program product stored on a recordable media for providing cross media error protection for multimedia data, the program product comprising: program code configured to receive multimedia data having a plurality of media streams, each of a different type; program code configured to determine a size of each media stream; program code configured to package the multimedia data into a plurality of discrete packets, wherein each discrete packet includes a data segment from each of the media streams, and wherein a size of each packet is proportional to the size of each media stream; and program code configured to insert error protection data into each packet.

BRIEF DESCRIPTION OF THE DRAWINGS

The preferred exemplary embodiment of the present invention will hereinafter be described in conjunction with the appended drawings, where like designations denote like elements, and.

DETAILED DESCRIPTION OF THE INVENTION

Figure 1:
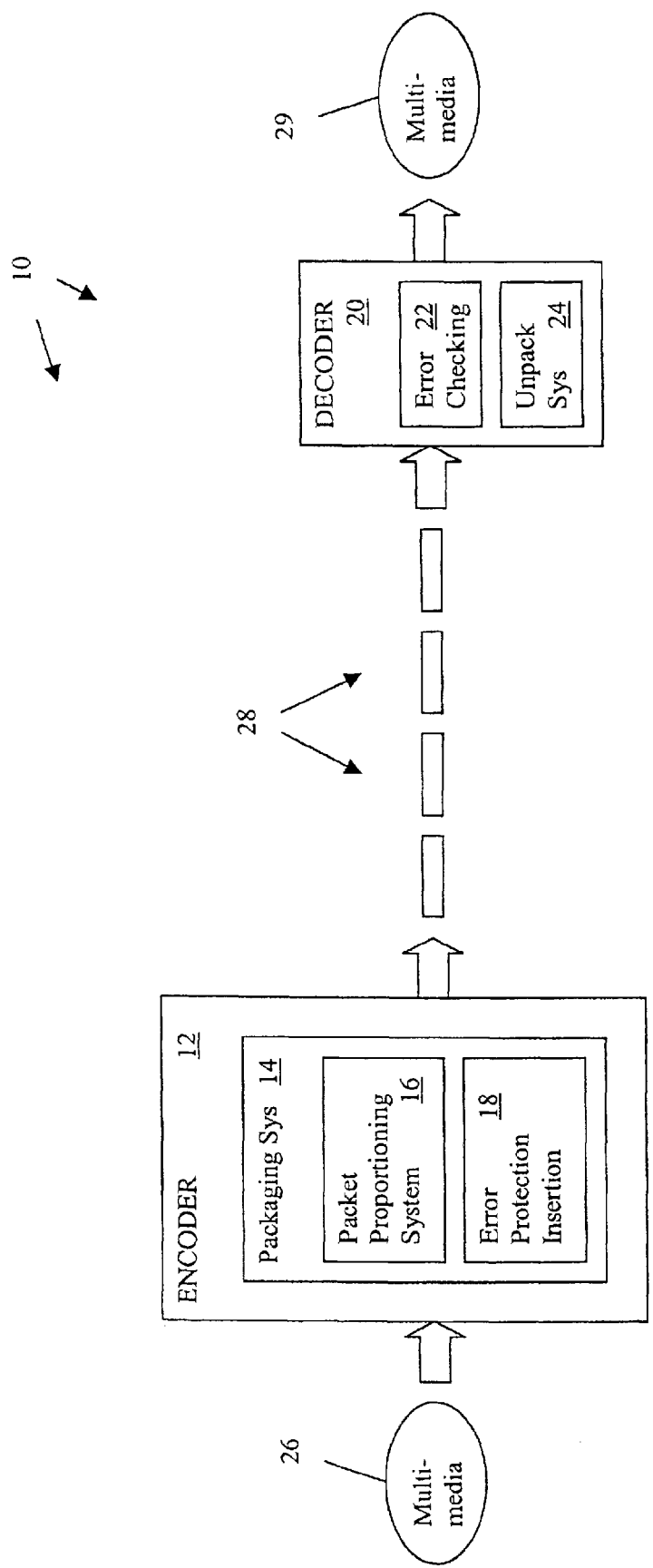
FIG. 1 depicts a block diagram of a cross media protection system in accordance with a preferred embodiment of the present invention.

Referring now to FIG. 1, a cross media error protection system 10 is shown. System 10 comprises an encoder 12 that receives multimedia data 26 and encodes the data 26 into a plurality of discrete packets 28, along with additional error protection data. The packets 28 are transmitted over a transmission channel and received by decoder 20, which decodes and converts the packets into multimedia data 29. As noted above, the term multimedia may comprise any content that includes multiple streams of data.

Figure 3:
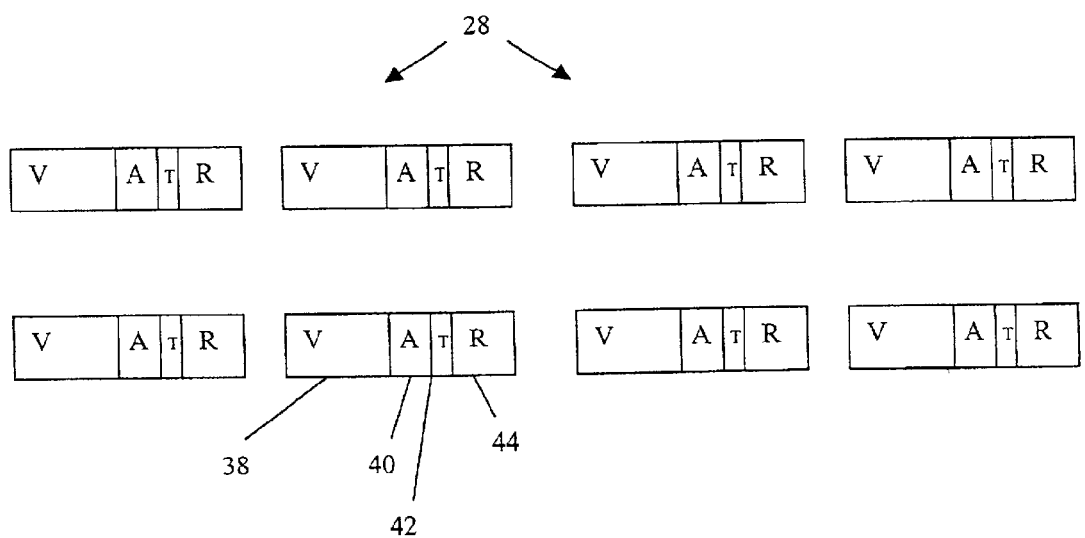
FIG. 3 depicts a cross media packaging scheme in accordance with the invention.

Encoder 12 includes a packaging system 14 that packages the multimedia data 26 with redundancy or error protection data. As can be seen in FIG. 3, and described in further detail below, packaging system 14 inserts a portion from each of the different media streams of the multimedia data into each packet 28. Packaging system 14 also inserts the necessary error protection data into each packet. In the preferred embodiment, the amount of each media type placed into each packet is proportional to the overall size of the different media streams received over a given time interval. Thus, a typical multimedia packet will contain a first (relatively large) field for holding a segment of video data, a second field for holding a segment of audio data, a third (relatively small) field for holding a segment of text data, and a fourth field for holding a segment of redundancy data.

In a preferred embodiment, packet proportioning system 16 handles the process of proportioning each packet as follows. First, streams of data are received, and a size of each media stream is determined over a particular time interval. Next, the relative proportions (i.e., size ratio) of the media streams are calculated. Finally, packet field sizes for each media stream and for the redundancy bits are allocated. Thus, assume that over a time interval, multimedia data was received having a first media stream of 1000 bits of a first type of data and a second media stream of 500 bits of a second type of data (e.g., a 2:1 ratio). Assume further that discrete packets of twenty bits were to be created, each with five redundancy bits (thus leaving fifteen bits of media data). Using the overall proportions of the two media streams, each packet would be allocated a first field to hold ten bits from the first media stream and a second field to hold five bits from the second media stream. A third field for holding the five redundancy bits would likewise be allocated. It should be understood that the method of proportioning packets described herein is for exemplary purposes only, and other methods could likewise be utilized, and therefore fall within the scope of this invention. For example, the field sizes in each packet could be "hard-coded" so that the size of each field is not determined dynamically based on the size of each stream. Additionally, the size of each media stream could be estimated based on typical requirements.

Once the field sizes are determined, packaging system 16 packages the media stream accordingly, and error protection bits are added by error protection system 18. Systems and schemes for adding error protection are well known in the art. The generated packets 28 can then be transmitted, or otherwise processed, and decoded by decoder 20. Decoder 20 includes an error checking system 22 for examining the error protection bits to determine if the packet was received intact. Error checking system 22 may also correct errors in the packet. Un-packaging system 24 then un-packages the media data bits from each of the fields in each packet and reconstructs the multimedia data streams 29 using the proportion scheme devised by packet proportioning system 16. In the case where packet proportioning system 16 determines field sizes dynamically based on stream sizes, the field sizes could be communicated to un-packaging system 24 using a predetermined protocol.

Figure 2:
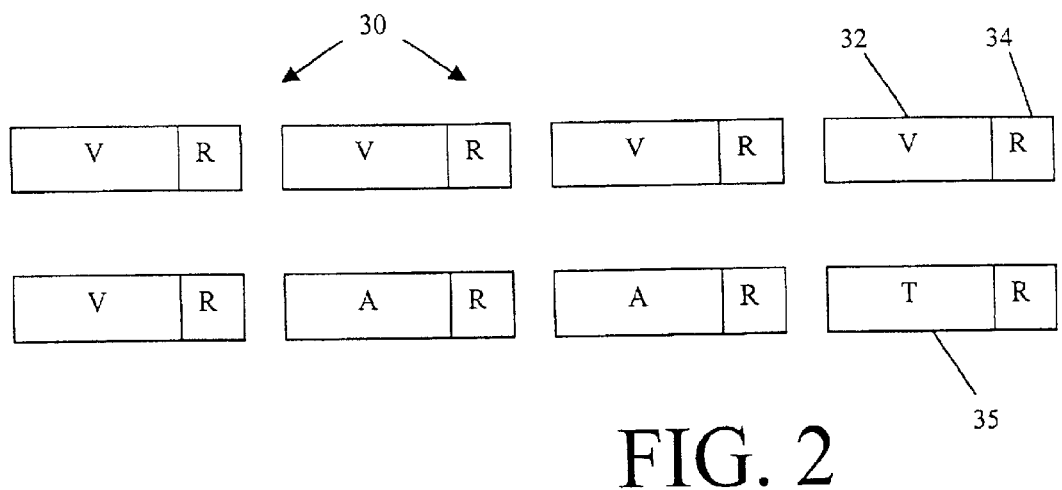
FIG. 2 depicts a typical packaging scheme for providing error protection.

Referring now to FIG. 3, an exemplary cross media packaging scheme is shown for a set of packets 28 with the same assumptions as those described for FIG. 2, namely, 25% redundancy is required for a given interval of time in which 80 bits of stream-1 (video V), 32 bits of stream-2 (audio A) and 16 bits of stream-3 (text t) are generated. In this embodiment, however, each packet contains data from each of the media streams. Furthermore, the amount of data from each stream that is contained in each packet is made proportional to the sizes of the video, audio and text streams, respectively, which in this case is 5:2:1. Similar to the case described for FIG. 2, eight packets, each of size twenty bits, are generated. However, in this case, each packet has four allocated fields containing a first segment 38 of ten bits of video information, a second segment 40 of four bits of audio, a third segment 42 of two bits of text, and a fourth segment 44 of four bits of redundancy information.

Now, assuming the transmission medium introduces the same amount of error as that described for FIG. 2, i.e., one of the packets is completely lost, the cross media error protection scheme of FIG. 3 ensures that no device will be starved for data during the time interval. Specifically, since the data in each packet contains segments for all the media streams, only a very small portion of the text stream is lost and the PDA device can still display the text information, albeit with some loss. Accordingly, this embodiment ensures that in the case of a lost packet, the data loss is spread out and shared by all of the media streams. Therefore, this cross-media error protection avoids a single stream from being completely lost due to transmission errors, thereby protecting users consuming text and other "thin" streams from starvation.

It is understood that the systems, functions, methods, and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of the invention have been presented for purposes of illustration and description. They are not intended to be exhaustive or to limit the invention to the precise form disclosed, and obviously many modifications and variations are possible in light of the above teachings. Such modifications and variations that are apparent to a person skilled in the art are intended to be included within the scope of this invention as defined by the accompanying claims.

What is claimed is:

1. A cross media error protection system for multimedia data having a plurality of media streams of different type, the system comprising: a calculation system for determining the size of each media stream over a particular time interval and the relative proportions of said media streams; a packaging system for packaging the multimedia data into discrete packets, wherein each packet includes a plurality of fields, and wherein data segments from each of the media streams are placed into different ones of the plurality of fields; and an insertion system for inserting error protection data into one of the plurality of fields in each packet, wherein a size of each of the plurality of fields is proportional to a size of each of the plurality of the media streams.

2. The cross media error protection system of claim 1, wherein a size of each of the plurality of fields is set at predetermined proportions.

3. The cross media error protection system of claim 1, wherein the plurality of media streams are selected from the group consisting of audio, video, graphics, and text.

4. The cross media error protection system of claim 1, further comprising a decoder for decoding the discrete packets of multimedia data.

5. An encoder for packaging multimedia data having a first and a second type of media stream, comprising: means for receiving the multimedia data; a calculation system for determining the size of each media stream over a particular time interval and the relative proportions of said media streams; and means for packaging the multimedia data into discrete packets, wherein each packet includes a first field for holding a segment of the first type of media, a second field for hold a segment of the second type of media stream, and a third field for holding error protection data; wherein the sizes of the first and second field are proportional to the sizes of the first and second media stream.

6. The encoder of claim 5, wherein the first and second type of media streams are selected from the group consisting of audio, video, text, and graphics.

7. A decoder for unpackaging multimedia data having a first and a second media stream of different type, the decoder comprising: means for receiving multimedia data; a calculation system for determining the size of each media stream over a particular time interval and the relative proportions of said media streams; and means for reading the multimedia data from discrete packets, wherein each packet includes a first field having a segment from the first media stream, a second field having a segment from the second media stream, and a third field having error protection data; wherein the sizes of the first and second field are proportional to the sizes of the first and second media stream.

8. The decoder of claim 7, wherein the first and second type of media streams are selected from the group consisting of audio, video, text, and graphics.

9. A method for providing cross media error protection for multimedia data, the method comprising: receiving multimedia data having a plurality of media streams, each of a different type; determining a size of each media stream over a particular time interval and the relative proportions of said each media streams; packaging the multimedia data into a plurality of discrete packets, wherein each discrete packet includes a data segment from each of the media streams, and wherein a size of each packet is proportional to the size of each media stream; and inserting error protection data into each packet.

10. The method of claim 9, wherein each of the discrete packets have a same size.

11. The method of claim 9, comprising the further step of transmuting the discrete packets.

12. The method of claim 11, comprising the further step of decoding the discrete packets back into the plurality of media streams.

13. A program product stored on a recordable media for providing cross media error protection for multimedia data, the program product comprising: program code configured to receive multimedia data having a plurality of media streams, each of a different type; program code configured to determine a size of each media stream over a particular time interval and the relative proportions of said media stream: program code configured to package the multimedia data into a plurality of discrete packets, wherein each discrete packet includes a data segment from each of the media streams, and wherein a size of each packet is proportional to the size of each media stream; and program code configured to insert error protection data into each packet.

14. The program product of claim 13, where the size of each media stream is determined over a predetermined interval of time.

15. The program product of claim 13, where the size of each media stream is estimated.

* * * * *